US012746485B2

(12) United States Patent
Altecor et al.

(10) Patent No.: US 12,746,485 B2
(45) Date of Patent: Sep. 29, 2026

(54) COMPACT IN-SITU GAS SEPARATOR FOR SUBSTRATE PROCESSING SYSTEMS

(71) Applicant: LAM RESEARCH CORPORATION, Fremont, CA (US)

(72) Inventors: Aleksey V. Altecor, Newberg, OR (US); Andrew Borth, Newberg, OR (US); Erica Sakura Strandberg Pohl, Sherwood, OR (US); Chi-Jung Cheng, Wilsonville, OR (US)

(73) Assignee: Lam Research Corporation, Fremont, CA (US)

( * ) Notice: Subject to any disclaimer, the term of this patent is extended or adjusted under 35 U.S.C. 154(b) by 317 days.

(21) Appl. No.: 18/705,685

(22) PCT Filed: Nov. 1, 2022

(86) PCT No.: PCT/US2022/048573

§ 371 (c)(1),
(2) Date: Apr. 29, 2024

(87) PCT Pub. No.: WO2023/086241

PCT Pub. Date: May 19, 2023

(65) Prior Publication Data

US 2026/0158412 A1 Jun. 11, 2026

Related U.S. Application Data

(60) Provisional application No. 63/277,418, filed on Nov. 9, 2021.

(51) Int. Cl.
*B01D 5/00* (2006.01)
*B01D 53/00* (2006.01)

(52) U.S. Cl.
CPC ......... *B01D 5/0051* (2013.01); *B01D 5/0036* (2013.01); *B01D 5/0042* (2013.01);
(Continued)

(58) Field of Classification Search
CPC .. B01D 5/0036; B01D 5/0042; B01D 5/0051; B01D 5/006; B01D 53/002; B01D 2221/14
See application file for complete search history.

(56) References Cited

U.S. PATENT DOCUMENTS 7,314,506 B2 1/2008 Vininski et al.
9,395,109 B2 7/2016 Berger et al.
(Continued)

FOREIGN PATENT DOCUMENTS

CN 115364505 A * 11/2022 ............. C01C 1/024
TW 350785 B 1/1999
(Continued)

OTHER PUBLICATIONS

Machine translation of CN-115364505-A (Year: 2022).*
(Continued)

*Primary Examiner* — Robert Clemente

(57) ABSTRACT

A gas separator includes a first distillation chamber and an evaporation chamber. A first liquid valve comprises an inlet in fluid communication with the first distillation chamber and an outlet in fluid communication with the evaporation chamber. A chiller is configured to chill the first distillation chamber to a first temperature and the evaporation chamber to a second temperature that is different than the first temperature. The gas separator operates a first mode during which distillation a gas mixture is received by the first distillation chamber, the gas mixture is separated into a first condensed liquid and a first separated gas mixture, and the separated gas is output by the first distillation chamber. During a second mode, the first liquid valve transfers the first condensed liquid to the evaporation chamber and the first distillation does not receive the gas mixture and does not supply the first separated gas mixture.

23 Claims, 11 Drawing Sheets

(52) U.S. Cl.
CPC ........... *B01D 5/006* (2013.01); *B01D 53/002* (2013.01); *B01D 2221/14* (2013.01)

(56) References Cited

U.S. PATENT DOCUMENTS

| | | | | |
|---|---|---|---|---|
| 2002/0179425 | A1 | 12/2002 | Dableh | |
| 2011/0247979 | A1 | 10/2011 | Cao et al. | |
| 2014/0290093 | A1 | 10/2014 | Jung et al. | |
| 2018/0023005 | A1 | 1/2018 | Beaver et al. | |
| 2019/0255460 | A1* | 8/2019 | Allen | B01D 1/30 |
| 2023/0001322 | A1* | 1/2023 | Peters | C02F 1/04 |
| 2023/0124058 | A1* | 4/2023 | Peters | B01D 1/28 202/180 |

FOREIGN PATENT DOCUMENTS

| | | | | |
|---|---|---|---|---|
| TW | 201718067 | A | 6/2017 | |
| TW | 202112424 | A | 4/2021 | |
| WO | WO-2017091851 | A1 * | 6/2017 | B01D 3/10 |

OTHER PUBLICATIONS

International Search Report and Written Opinion of the ISA issued in PCT/US2022/048573, mailed Mar. 2, 2023; ISA/KR.
Office Action issued in corresponding Taiwanese Application No. 111142569 dated Nov. 13, 2025.

* cited by examiner

DC=Don't Care

| State | VL1 | VL2 | VL3 | VL4 | VL5 | VL6 |
|---|---|---|---|---|---|---|
| Error/ILK | X | X | X | X | X | X |
| PM supply (normal operate) | X | Open | X | Open | X | X |
| Flow to divert | DC | DC | X | X | Open | X |
| Liquid move | X | X | Open | X | X | X |
| Purge (default) | Open | X | Open | X | Open | DC |

Liquid Move

Flow to Divert

COMPACT IN-SITU GAS SEPARATOR FOR SUBSTRATE PROCESSING SYSTEMS

CROSS-REFERENCE TO RELATED APPLICATIONS

This application is a U.S. National Phase Application under 35 U.S.C. 371 of International Application No. PCT/US2022/048573, filed on Nov. 1, 2022, which claims the benefit of U.S. Provisional Application No. 63/277,418 filed on Nov. 9, 2021. The entire disclosures of the above applications are incorporated herein by reference.

FIELD

The present disclosure relates to substrate processing systems, and more particularly to a gas separator for process gas for a substrate processing system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems may be used to perform deposition, etching and/or other treatment of substrates such as semiconductor wafers. A substrate may be arranged on a pedestal in a processing chamber. During deposition, a deposition gas mixture including one or more precursors is supplied to the processing chamber. During etching, an etch gas mixture is supplied to the processing chamber. In some applications, plasma may be struck in the processing chamber to promote chemical reactions.

Some gases that are used as precursors during substrate processing (such as acetylene ($C_2H_2$)) are unstable in their pure form. As a result, these types of gases may be supplied in pressurized cylinders with liquid solvent. For example, a mixture of acetylene and liquid acetone may be supplied in pressurized cylinders. As the pressurized cylinder is depleted, increasing concentrations of acetone are supplied. However, it is important for the precursor gases to have constant properties during delivery to the processing chamber to maintain substrate uniformity during processing of multiple substrates.

Prior to usage in a process, gas separation may be performed to separate the mixture. For example, gas separation may be used to separate acetylene and acetone. There are several ways to perform gas separation/purification. In a first approach, a gas bubbler system is operated at a predetermined temperature to establish a controlled humidity environment for the acetone concentration. This approach is relatively compact and provides a closed system solution that requires relatively infrequent maintenance (~every 6-8 months). Disadvantages of this approach include the need for a relatively large amount of liquid to be contained within and moved around in the system. The system requires careful consideration of the inlet gas concentration and is sensitive to inlet pressure variations. A lowest output concentration is generally not sufficiently low for high-throughput processes.

In another approach, an incoming gas stream is cooled in two stages to a liquid distillation temperature and then the gas passes through a torturous cooled medium to separate out the condensate. This approach requires more floor space in a fab room and is typically installed in a gas cabinet row in a sub-fabrication room, which is not located near the tool. This system is sensitive to incoming gas quality, has much shorter service intervals (1-3 months) and requires manual handling of the separated fluid. Since this system operates at colder temperatures, it is capable of high levels of gas purity.

SUMMARY

A gas separator for a substrate processing system includes a first distillation chamber and an evaporation chamber. A first liquid valve comprises an inlet in fluid communication with the first distillation chamber and an outlet in fluid communication with the evaporation chamber. A chiller is configured to chill the first distillation chamber to a first temperature and the evaporation chamber to a second temperature that is different than the first temperature. During a first mode, the first distillation chamber is configured to receive a gas mixture comprising N gases at an inlet of the first distillation chamber, where N is an integer greater than one, to separate the gas mixture, by condensing at least one of the N gases, into a first condensed liquid and a first separated gas mixture, to store the first condensed liquid in the first distillation chamber and to supply the first separated gas mixture at a first outlet of the first distillation chamber. During a second mode, the first liquid valve transfers the first condensed liquid from a second outlet of the first distillation chamber to the evaporation chamber and the first distillation chamber does not receive the gas mixture via the inlet of the first distillation chamber and does not supply the first separated gas mixture via the first outlet of the first distillation chamber.

In some embodiments, the first separated gas mixture is supplied to a processing chamber. A second distillation chamber is configured to receive the first separated gas mixture from the first distillation chamber via a first inlet of the second distillation chamber. A second liquid valve comprises an inlet in fluid communication with the second distillation chamber.

In some embodiments, during a first mode of the second distillation chamber, the second distillation chamber is configured to receive the first separated gas mixture at the first inlet of the second distillation chamber, separate the first separated gas mixture, by condensing another one of the N gases, into a second condensed liquid and a second separated gas mixture, store the second condensed liquid in the second distillation chamber and supply the second separated gas mixture at a first outlet of the second distillation chamber. During the second mode of the second distillation chamber, the second liquid valve supplies the second condensed liquid from the second outlet of the second distillation chamber to the evaporation chamber and the second distillation chamber does not receive the first separated gas mixture via the first inlet of the second distillation chamber and does not supply the second separated gas mixture via the first outlet of the second distillation chamber.

In some embodiments, the first distillation chamber comprises a body defining a torturous path, a cavity and a channel. The torturous path comprises an inlet, in fluid communication with the inlet of the first distillation chamber, to receive the gas mixture and an outlet to supply the first condensed liquid and the first separated gas mixture to the cavity. The channel fluidly connects the cavity to the first outlet of the first distillation chamber.

In some embodiments, the body of the first distillation chamber is made of a solid block of a material that has been machined. The material comprises stainless steel. The chiller comprises a first cooling member comprising channels configured to receive a fluid, a first Peltier device comprising a first side in thermal communication with the first cooling member. A heat transfer member is in thermal communication with a second side of the first Peltier device and with the evaporation chamber. A second Peltier device comprises a first side in thermal communication with the heat transfer member and a second side in thermal communication with the first distillation chamber. The gas mixture comprises acetylene and acetone.

A gas delivery system comprises a gas box housing the gas separator. An abatement system is in fluid communication with the gas box and is configured to evacuate the gas box during operation of the gas separator.

A system comprises N of the gas separators, where N is an integer greater than one and M processing chambers, where M is an integer greater than zero. A plurality of valves is configured to connect any one of the N gas separators to any one or more of the M processing chambers.

A gas separator for a substrate processing system includes a distillation chamber configured to operate in a first mode and a second mode and an evaporation chamber. A first liquid valve comprises an inlet in fluid communication with the distillation chamber and an outlet in fluid communication with the evaporation chamber. A first chiller is arranged in thermal communication with first side surfaces of the distillation chamber and the evaporation chamber. The first chiller comprises a first cooling member comprising channels configured to receive a fluid, a first Peltier device comprising a first side in thermal communication with the first cooling member, a heat transfer member in thermal communication with a second side of the first Peltier device and with the evaporation chamber, and a second Peltier device comprising a first side in thermal communication with the first cooling member and a second side in thermal communication with the distillation chamber.

In some embodiments, a second chiller comprises a second cooling member comprising channels configured to receive a fluid; a third Peltier device comprising a first side in thermal communication with the second cooling member; a heat transfer member in thermal communication with a second side of the third Peltier device and with the evaporation chamber; and a fourth Peltier device comprising a first side in thermal communication with the heat transfer member and a second side in thermal communication with the distillation chamber.

In some embodiments, the second chiller is arranged in thermal communication with a second side surface of the distillation chamber and a second side surface of the evaporation chamber. The gas separator operates in a batch mode comprising a supply mode and a liquid move mode.

In some embodiments, during a first mode, the distillation chamber is configured to receive a gas mixture comprising N gases at an inlet of the distillation chamber, where N is an integer greater than one, separate the gas mixture, by condensing at least one of the N gases, into a condensed liquid and a first separated gas mixture, store the condensed liquid in the distillation chamber, and supply the first separated gas mixture to a first outlet of the distillation chamber. During a second mode, the first liquid valve supplies the condensed liquid stored in the distillation chamber from a second outlet of the distillation chamber to the evaporation chamber and the distillation chamber does not receive the gas mixture via the inlet and does not supply the first separated gas mixture via the first outlet.

In some embodiments, the distillation chamber comprises a body defining a torturous path, a cavity and a channel. The torturous path comprises an inlet in fluid communication with the inlet of the distillation chamber to receive the gas mixture and an outlet to supply the condensed liquid and the first separated gas mixture to the cavity. The channel connects the cavity to the first outlet of the distillation chamber.

In some embodiments, the torturous path has a spiral shape. The body of the distillation chamber is made of a solid block of a material than has been machined. The material comprises stainless steel. The gas mixture comprises acetylene and acetone.

A gas delivery system comprises a gas box housing the gas separator. An abatement system is in fluid communication with the gas box and is configured to evacuate the gas box during operation of the gas separator.

A system comprises N of the gas separators, where N is an integer greater than one, and M processing chambers, where M is an integer greater than zero. A plurality of valves is configured to connect any one of the N gas separators to any one or more of the M processing chambers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
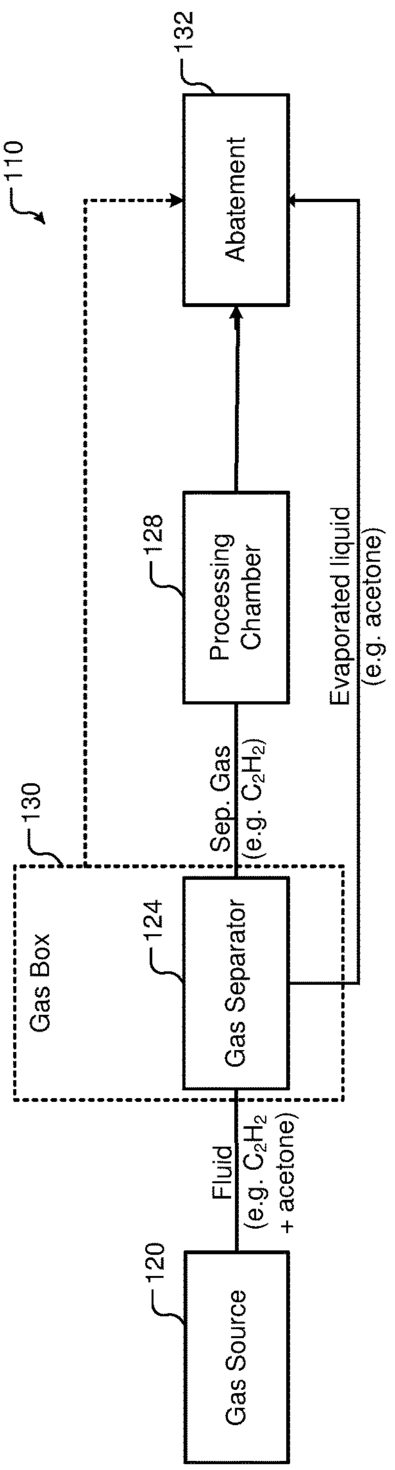
FIG. 1 is a functional block diagram of an example of a gas separator according to the present disclosure.

A gas separator according to the present disclosure separates two or more different gases in a gas mixture. For example, a wet gas mixture including acetylene and acetone can be separated/purified into mostly acetylene gas and liquid acetone.

The gas separator includes a distillation chamber including a torturous path that outputs gas (such as acetylene) and condensed fluid (such as acetone). In some examples, the torturous path has a spiral shape, although other shapes can be used. The condensed fluid flowing from an outlet of the torturous path is collected in a cavity in the distillation chamber. Separated gas flows from the cavity to a first outlet of the distillation chamber and then to a processing chamber. The condensed fluid is supplied via a second outlet of the cavity in the distillation chamber to an evaporation chamber, evaporated and output to an abatement system.

A multi-zone chiller cools the distillation chamber to a first temperature T1 and the evaporation chamber to a second temperature T2 that is higher than the first temperature T1. The first temperature T1 of the distillation chamber is selected at or below a gas to liquid phase transition temperature (at the supplied gas pressure) of the gas (e.g. acetone) to be separated from the gas mixture and above a gas to liquid phase transition temperature of the gas (e.g. acetylene) to be supplied to the processing chamber. The second temperature T2 of the evaporation chamber is selected above the evaporation temperature of the condensed liquid.

In some examples, the multi-zone chiller includes a cooled member, a first Peltier device, a heat transfer member and a second Peltier device that are in thermal contact. The cooled member may be in the form of a rectangular plate (or another structure having a different shape) that includes channels for receiving a fluid such as process chilled water (PCW). The first and second Peltier devices are configured to move heat into the cooled member to cool the distillation chamber to the first temperature T1. Most of the acetone (and anything else with phase transitions up to that point) is condensed into liquid. The second Peltier device is configured to cool to the evaporation chamber to the second temperature T2, which is sufficient to evaporate the condensed liquid.

The gas separator uses batched operation. In other words, the gas mixture is supplied to the distillation chamber and condensed liquid is stored in the cavity in the distillation chamber while the separated gas is supplied to the processing chamber. Then, supply of the gas mixture is stopped and the stored condensed liquid is moved to the evaporation chamber, evaporated and delivered to an abatement system.

The gas separator can be configured with additional stages connected in a daisy chain to allow separation of additional gases from the gas mixture in the additional stages. Alternately, the gas separator can be configured in parallel with other gas separators to support higher gas flows and/or redundancy.

Liquid movement In the gas separator is in one direction, which requires fewer valves and interlocks than other gas separator approaches. There are no internal moving parts, which increases reliability. The footprint and packaging can be tuned for specific spacing requirements, which allows flexibility and placement near the processing chambers or on the tool. In some examples, the gas separator is arranged in existing gas boxes that are exhausted to the abatement system.

Referring now to FIG. 1, a substrate processing system 110 includes a gas source 120 supplying a gas mixture to a gas separator 124. While the gas source 120 and the gas separator 124 will be described below in the context of separating/purifying a mixture of acetylene and acetone, it can be appreciated that other gas mixtures or wetted gases may be separated using a similar approach. The substrate processing system 110 includes a processing chamber 128 and an abatement system 132.

In use, the gas source 120 supplies the gas mixture (e.g the gas mixture of acetylene and acetone) to the gas separator 124. The gas separator 124 separates most of a first gas (e.g acetone) from the gas mixture by condensing the first gas, supplies the remaining gas mixture (e.g. mostly acetylene) to the processing chamber 128, evaporates the condensed first gas (e.g. acetone) and outputs the vaporized first gas to the abatement system 132.

Figure 2:
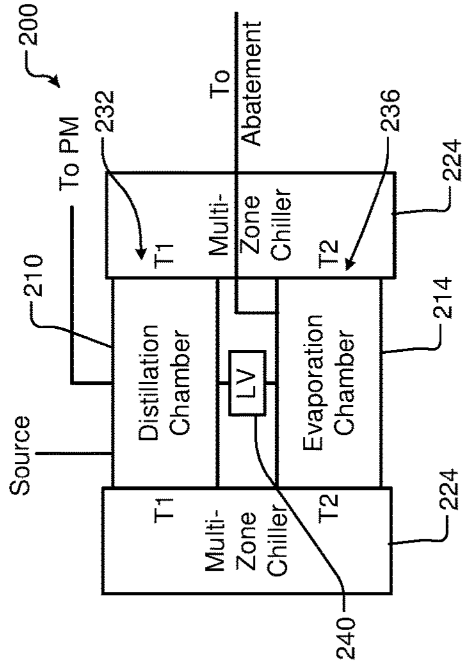
FIG. 2 is a more detailed functional block diagram of an example of a single-stage gas separator according to the present disclosure.

Referring now to FIG. 2, a e gas separator 200 includes a distillation chamber 210 and an evaporation chamber 214. A multi-zone chiller 224 is in contact with one or more outer surfaces of the distillation chamber 210 and the evaporation chamber 214. In some examples, two multi-zone chillers are used to cool opposite side surfaces of the distillation chamber 210 and the evaporation chamber 214.

The multi-zone chiller 224 cools the distillation chamber 210 to a first temperature T1 at 232 and the evaporation chamber to a second temperature T2 at 236. In some examples, the first temperature T1 is lower than the second temperature T2. In some examples, the first temperature T1 is in a first temperature range from −5° C. to −60° C. (e.g. −50° C.) and the second temperature T2 is in a second temperature range from 0 to −5° C. (e.g. −5° C.), although other temperatures can be used.

During a first stage of a batch operation, the gas source supplies the gas mixture to the distillation chamber 210 operating at temperature T1. Part of the gas mixture (e.g. acetone) condenses and is temporarily stored in the distillation chamber 210 and the remaining part of the gas mixture remains in a gaseous state (e.g. mostly acetylene) and is delivered to the processing chamber. During a second stage of the batch operation, the condensed fluid is supplied by a liquid valve to the evaporation chamber 214, evaporated and sent to the abatement system 132.

Figure 3:
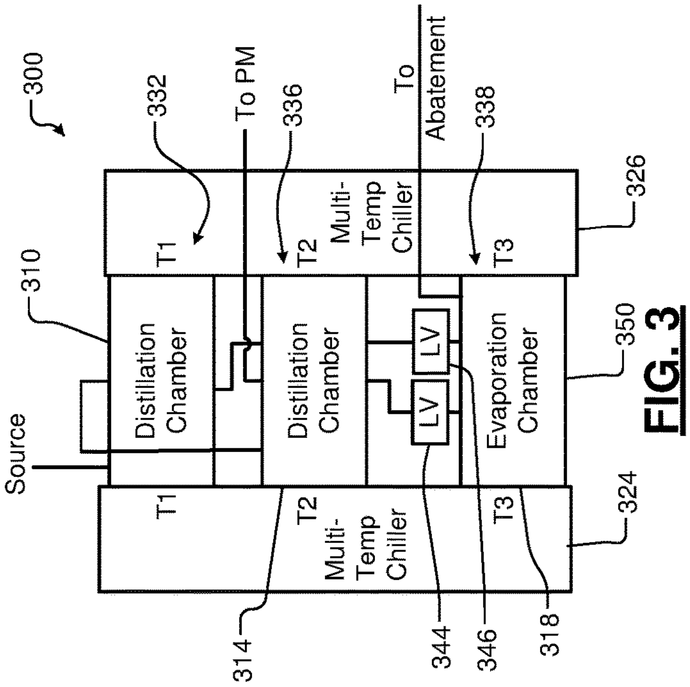
FIG. 3 is a more detailed functional block diagram of an example of a dual-stage gas separator according to the present disclosure.

Referring now to FIG. 3, a gas separator 300 includes a first distillation chamber 310, a second distillation chamber 314 and an evaporation chamber 318. A multi-zone chiller 324 is in contact with outer surfaces of the first distillation chamber 310, the second distillation chamber 314 and the evaporation chamber 318. The multi-zone chiller 324 cools the first distillation chamber 310 to a first temperature T1 at 332, the second distillation chamber 314 to a second temperature T2 at 336, and the evaporation chamber to a third temperature T3 at 338. In some examples, the first temperature T1 is lower than the second temperature T2 and the second temperature is lower than the third temperature T3.

In use, the gas source supplies the gas mixture to the first distillation chamber 310 operating at the temperature T1. One or more gases of the gas mixture condense in the first distillation chamber 310 and a first remaining portion of the gas mixture (still in a gaseous state) is delivered to the second distillation chamber 314. One or more gases in the first remaining gas mixture condense in the second distillation chamber 314 and a second remaining portion of the gas mixture (in a gaseous state) is delivered to the processing chamber 128. Eventually, the condensed fluids in the first and second distillation chambers 310 and 314 are supplied by liquid valves 344 and 346 to the evaporation chamber 350. While a single evaporation chamber 350 is shown, separate evaporation chambers 350 can be used for each of the first distillation chamber 310 and the second distillation chamber 314, respectively. The condensed liquids are vaporized and sent to the abatement system.

Figure 4:
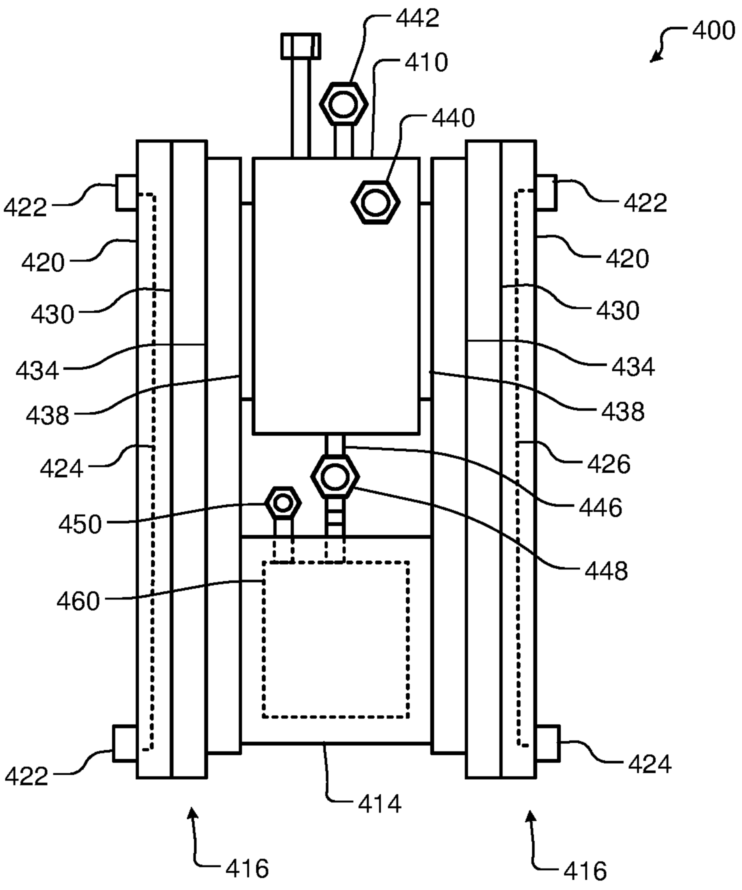
FIG. 4 is a side view of an example of a gas separator including a distillation chamber and an evaporation chamber according to the present disclosure.

Referring now to FIG. 4, a gas separator 400 includes a distillation chamber 410 and an evaporation chamber 414. One or more multi-stage chillers 416 are arranged in contact with side surfaces of the distillation chamber 410 and the evaporation chamber 414. The multi-stage chillers 416 are shown to include a plenum 420 including one or more inlets 422, one or more outlets 424 and one or more fluid channels 426 for receiving a liquid such as process chilled water (PCW) or fluid such a cooled heat transfer gas.

A first Peltier device 430 is arranged between the plenum 420 and a heat transfer member 434. The heat transfer member 434 may be in the form of a plate or another structure having a different shape. A hot side of the first Peltier device 430 is arranged in thermal contact with the plenum 420 and a cool side of the first Peltier device 430 is arranged in thermal contact with the heat transfer member 434. A second Peltier device 438 is arranged between the heat transfer member 434 and a surface of the distillation chamber 410. A hot side of the second Peltier device 438 is arranged in thermal contact with the heat transfer member 434 and a cool side of the second Peltier device 438 is arranged in thermal contact with the surface of the distillation chamber 410. The heat transfer member 434 is also in contact with a surface of the evaporation chamber 414.

The gas mixture is supplied to the distillation chamber 410 via an inlet 440 and separated gas is output via outlet 442. Condensed liquid is supplied via outlet 446 and liquid valve 448 from the distillation chamber 410 to a cavity 460 in the evaporation chamber 414. A second outlet 450 of the evaporation chamber 414 is connected to the abatement system 132.

Figure 5:
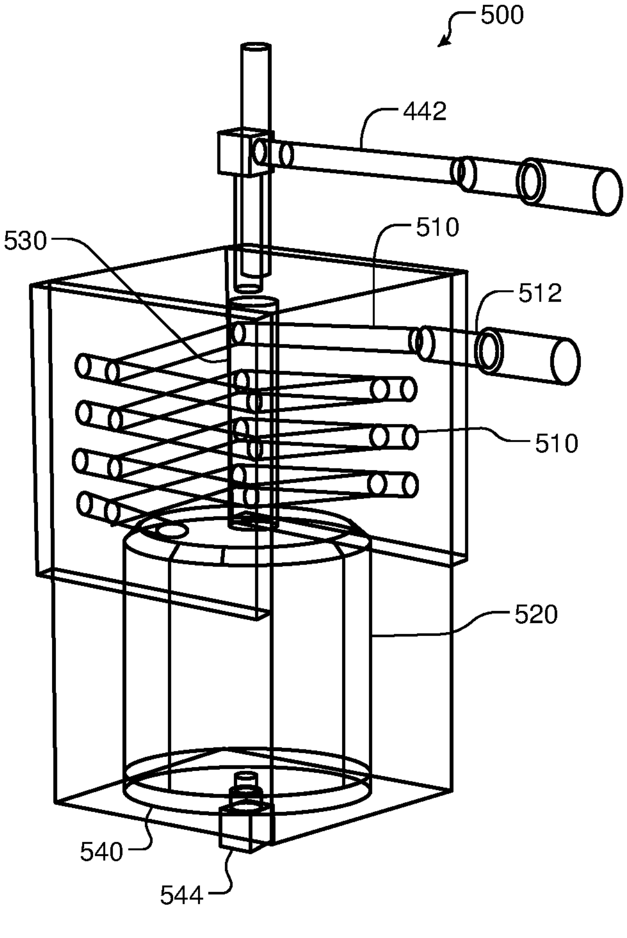
FIG. 5 is a perspective line drawing showing an example of the distillation chamber according to the present disclosure.

In FIG. 5, a distillation chamber 500 includes an internal torturous path 510 in fluid communication with an inlet 512. The gas mixture from the gas source travels through the torturous path 510, which is controlled to the first temperature T1. The length and cross-sectional area of the torturous path 510 is selected to provide a sufficient flow rate and residence time of the fluid to allow condensation of a portion of the fluid (e.g. acetone). An outlet of the torturous path 510 is fluidly connected to a cavity 520, which collects the condensed fluid. The gas flows to an outlet channel 530 extending from a top of the cavity 520 to the outlet of the distillation chamber, which is fluidly connected to the processing chamber. In some example, the tortuous path 510 has a general spiral shape that creates a vortex or circular rotation in the cavity 520. A lower portion 540 of the cavity 520 includes an outlet 544 connected by the liquid valve to the evaporation chamber.

In some examples, bodies of the distillation chamber 500 and the evaporation chamber are made from a solid block of material such as stainless steel (SST) that is machined. The torturous path 510 is formed by drilling holes into the block from the sides at angles. Each of the drilled holes intersects with another drilled hole from another face. Openings at the sides are then blocked to create a sealed torturous path including an inlet and an outlet. In some examples, the small size of the distillation and evaporation chambers enables use of 316 SST as the body material (because over shorter distances the relatively low thermal conductance of stainless steel is less of a design factor). Use of this material enables construction of the entire wetted gas path while meeting high-purity gas line requirements and methods. This approach also allows direct weldability to standard face metal seal gaskets and surface-mount sealed components for more direct assembly integration and lower cost without risk of impurities or contamination.

Figure 6A:
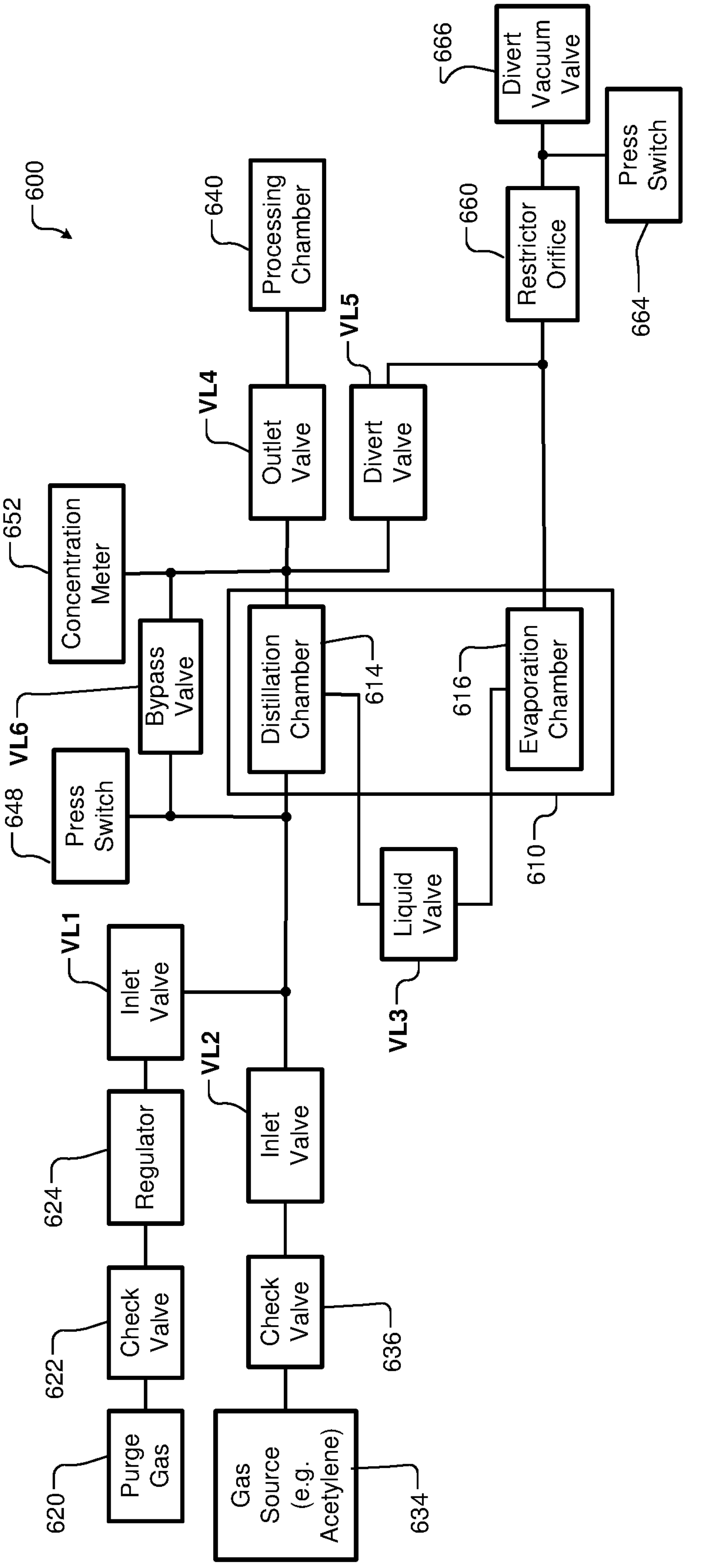
FIG. 6A is a functional block diagram of an example of a gas delivery system including the gas separator according to the present disclosure.

Referring now to FIG. 6A, a gas delivery system 600 including a gas separator 610 is shown. The gas separator 610 includes a distillation chamber 614 and an evaporation chamber 616. A liquid valve VL3 is connected between a first outlet of the distillation chamber 614 and an inlet of the evaporation chamber 616.

A purge gas source 620 is connected by a check valve 622, a regulator 624 and an inlet valve VL1 to an inlet of the distillation chamber 614. A gas source 634 is connected by a check valve 636 and an inlet valve VL2 to the inlet of the distillation chamber 614. In some examples, the gas source comprises a mixture of acetylene and acetone, although other gas mixtures can be used. A pressure switch 648 is connected to the inlet of the distillation chamber 614. In some examples, the pressure switch 648 closes when the measured pressure is greater than a predetermined pressure such as 1500 Torr (T), although other pressure values can be used. A bypass valve VL6 is connected to the inlet and a second outlet of the distillation chamber 614. A concentration meter 652 is connected to the output of the distillation chamber 614.

An outlet valve VL4 connects the second outlet of the distillation chamber 614 to processing chambers 640. A divert valve VL5 connects the second outlet of the distillation chamber 614 to a restricted orifice 660 and a divert vacuum valve 666, which is fluidly connected to the abatement system. A pressure switch 664 may be connected to an outlet of the restricted orifice 660 and the inlet of the divert vacuum valve 666. In some examples, the pressure switch 664 closes when the measured pressure is greater than a predetermined pressure such as 75 T, although other pressure values can be used.

Figure 6C:
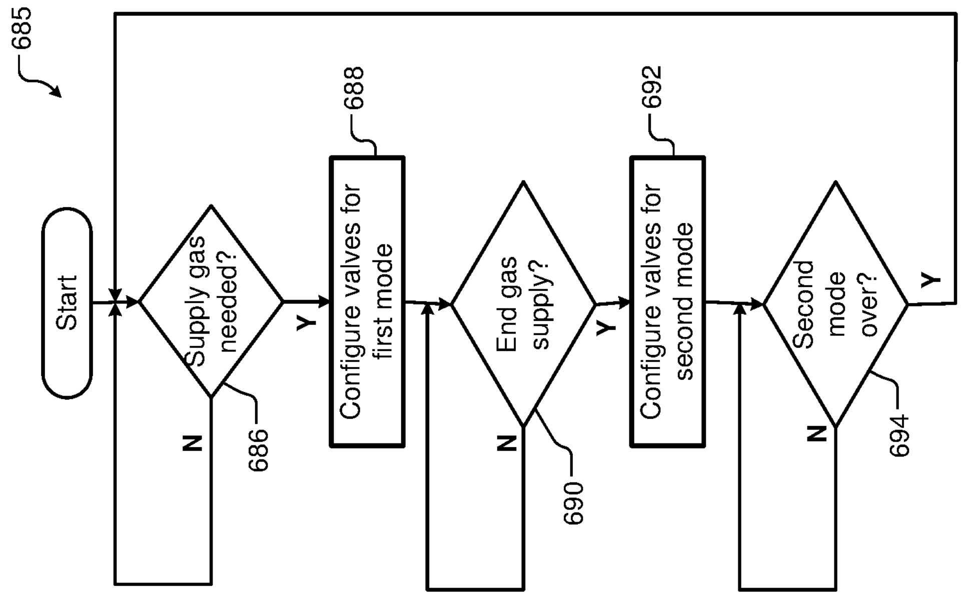
FIG. 6C is a flowchart of an example of a method for operating the gas separator according to the present disclosure.
Figure 6B:
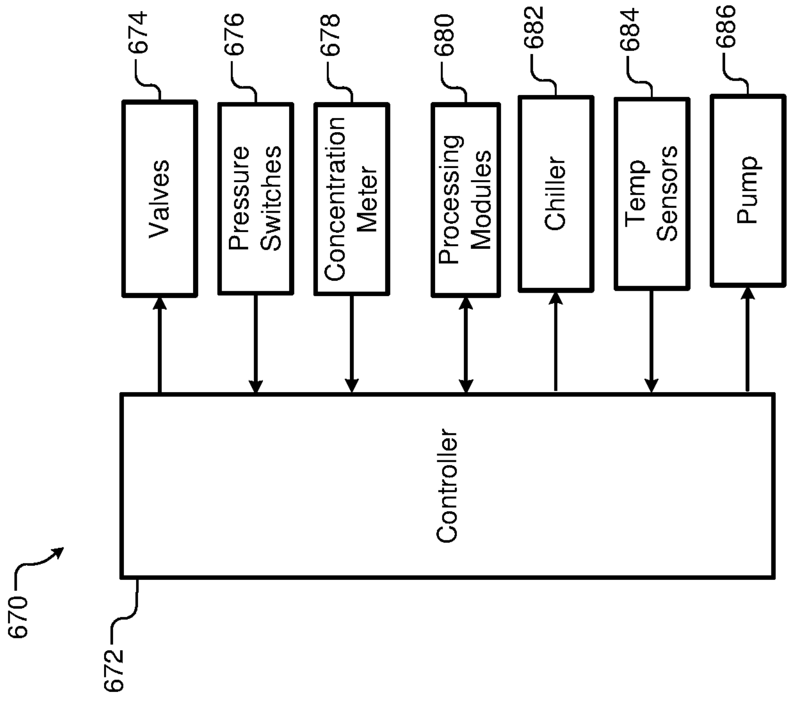
FIG. 6B is a functional block diagram of an example of a control system for the gas separator according to the present disclosure.

Referring now to FIG. 6B, a control system 670 for the gas separator is shown. The control system 670 includes a controller 672 that controls system valves 674 and one or more processing chambers 680 based on a recipe. The controller receives feedback from a concentration meter 678, one or more pressure switches 676 and the concentration meter 678. The controller 672 controls a chiller 682 and a pump 686 based on one or more temperature sensors 684 to control temperatures of the distillation chamber(s) and the evaporation chamber(s). The controller 672 controls modes of the gas separator between off, gas supply and liquid movement modes. In some examples, the controller 672 controls M gas separators for N processing chambers, where M is greater than one and N is greater than zero, as will be described further below.

Referring now to FIG. 6C, a method 685 for operating the gas separator is shown. At 686, the method determines whether process gas supply (e.g. acetylene) is needed. At 688, the method configures the valves for a gas supply mode. At 690, the method determines whether the gas supply is no longer needed or a batch period is up. If 690 is false, the method returns to 690. If 690 is true, the method configures the valves in a liquid movement mode at 692. At 694, the method determines whether the second mode can be ended (e.g. after a period sufficient for condensed liquid (e.g. acetone) to be moved to the evaporation chamber). If 694 is true, the method returns to 686.

Figure 6D:
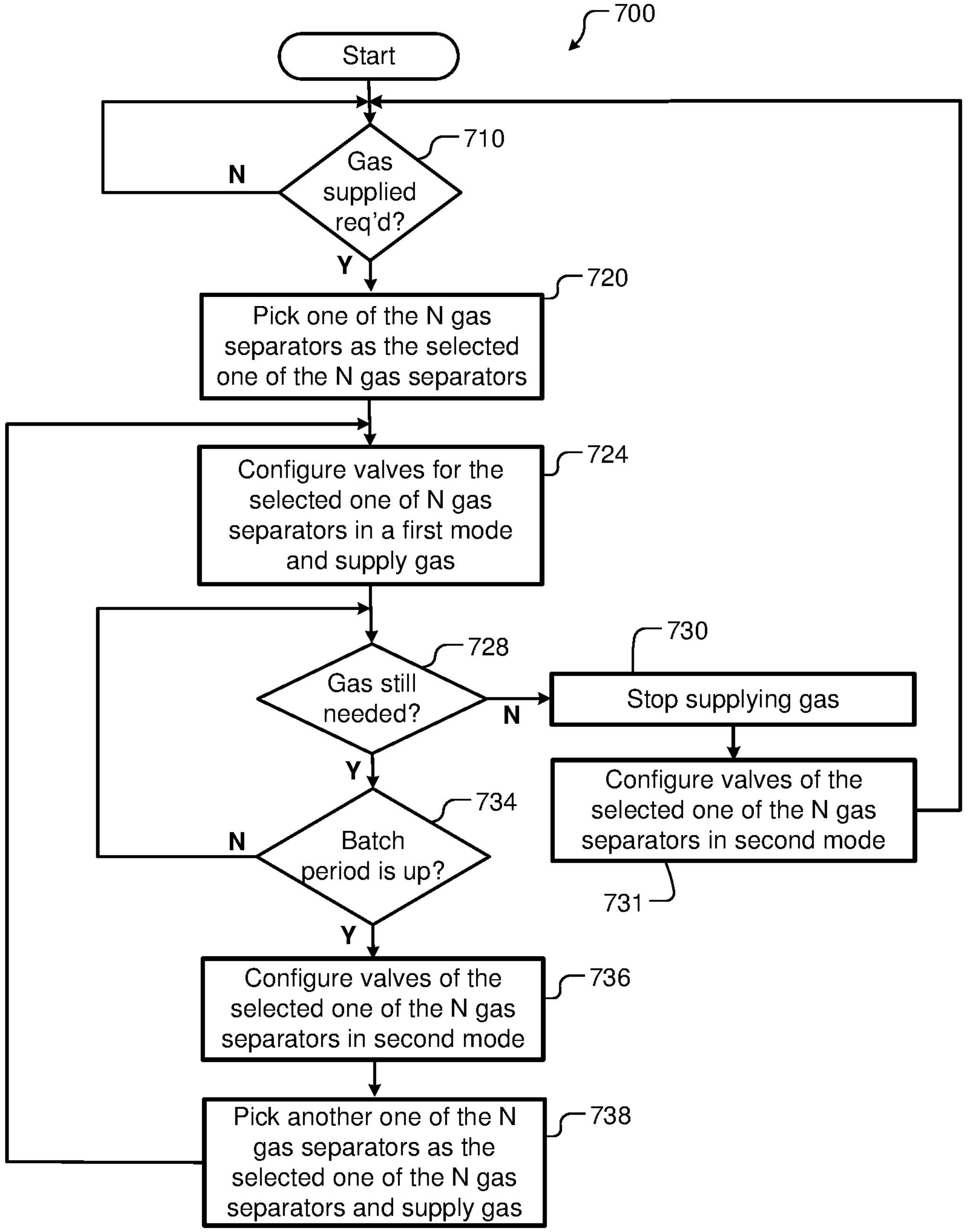
FIG. 6D is a flowchart of an example of another method for operating the gas separator with one or more redundant gas separators according to the present disclosure.

Referring now to FIG. 6D, another method 700 is shown for operating N gas separators. Instead of waiting while the gas separator moves the liquid to the evaporation chamber, another one of the N gas separators is fluidly connected to the processing chamber to reduce downtime of the processing chamber. At 710, the method determines whether gas supply is required. If 710 is true, the method continues at 720 and one of the N gas separators is selected to supply the process gas.

At 724, valves connecting the selected one of the N gas separators are configured in a first mode and the process gas is supplied (and condensed liquid is stored). At 728, the method determines whether supply of the process gas is still needed. If 728 is false, the gas supply is stopped at 730. In some examples, valves of the selected one of the N gas separators are configured in a second mode to move the liquid to the evaporation chamber at 731.

If 728 is true, the method determines whether the first mode of the batch period is up. If 734 is false, the method returns to 728. If 734 is true, the method continues at 736 and valves of the selected one of the N gas separators are configured in a second mode to move the liquid to the evaporation chamber. At 738, another one of the N gas separators is selected as the selected one of the N gas separators to supply gas to the processing chamber and the method returns to 724. This method reduces downtime. In some examples, the order of steps 736 and 738 are reversed or done at the same time.

As can be appreciated, the method shown in FIG. 6D can be varied to supply gas from two or more of the N gas separators at the same time and then switch to two or more different ones of the N gas separators.

Figure 7:
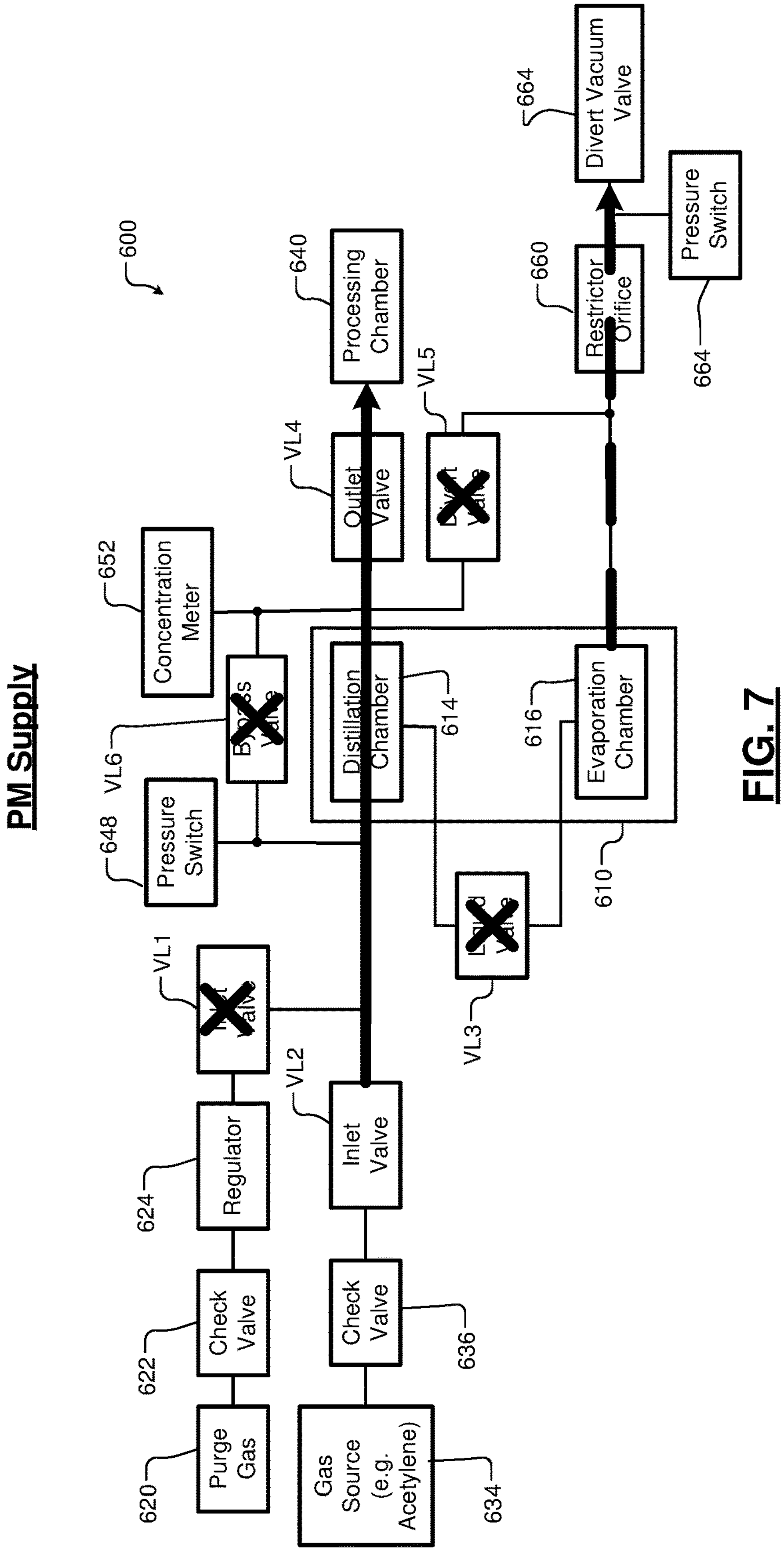
FIGS. 7-10 are functional block diagrams of example configurations of the gas delivery system of FIG. 6.

Referring now to FIGS. 7-10, various example configurations of the gas delivery system 600 are shown. In FIG. 7, the gas delivery system 600 is shown in a PM supply configuration. The valves VL1, VL3, VL5 and VL6 are closed. The valves VL2 and VL4 are open. The gas mixture flows from the gas source 634 through the check valve 636 and the inlet valve VL2 to the inlet of the distillation chamber 614. Gas is separated from condensed liquid. The separated gas flows from the second outlet of the distillation chamber 614 through the outlet valve VL4 to the processing chambers 640.

Figure 8:
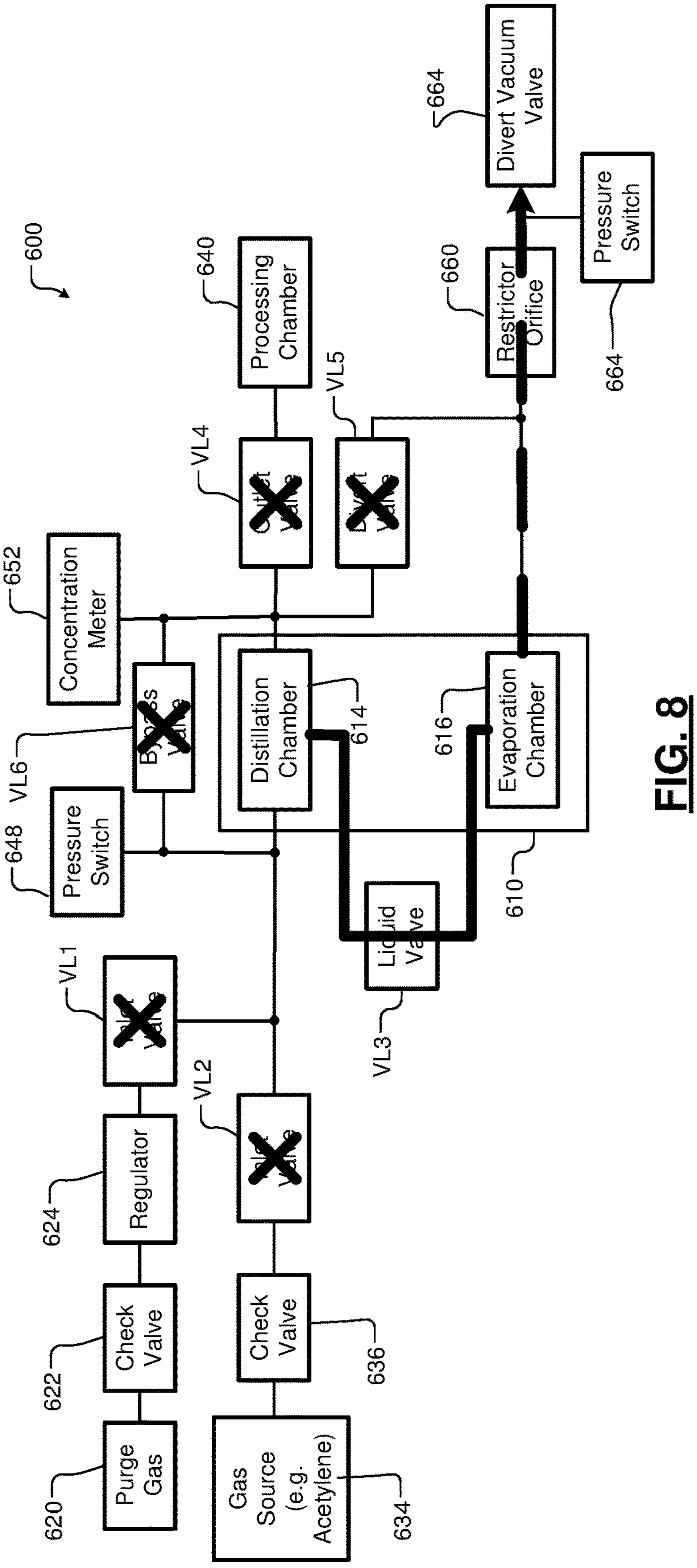

In FIG. 8, the gas delivery system 600 is shown in a liquid movement mode during which the condensed liquid is moved from the first outlet of the distillation chamber 614 to the evaporation chamber 616. The valves VL1, VL2, VL4, VL5 and VL6 are closed and the valve VL3 is opened. The condensed liquid flows from the distillation chamber 614 into the evaporation chamber 616 where it is evaporated and output by the restricted orifice 660 and the divert vacuum valve 666 to the abatement system.

Figure 9:
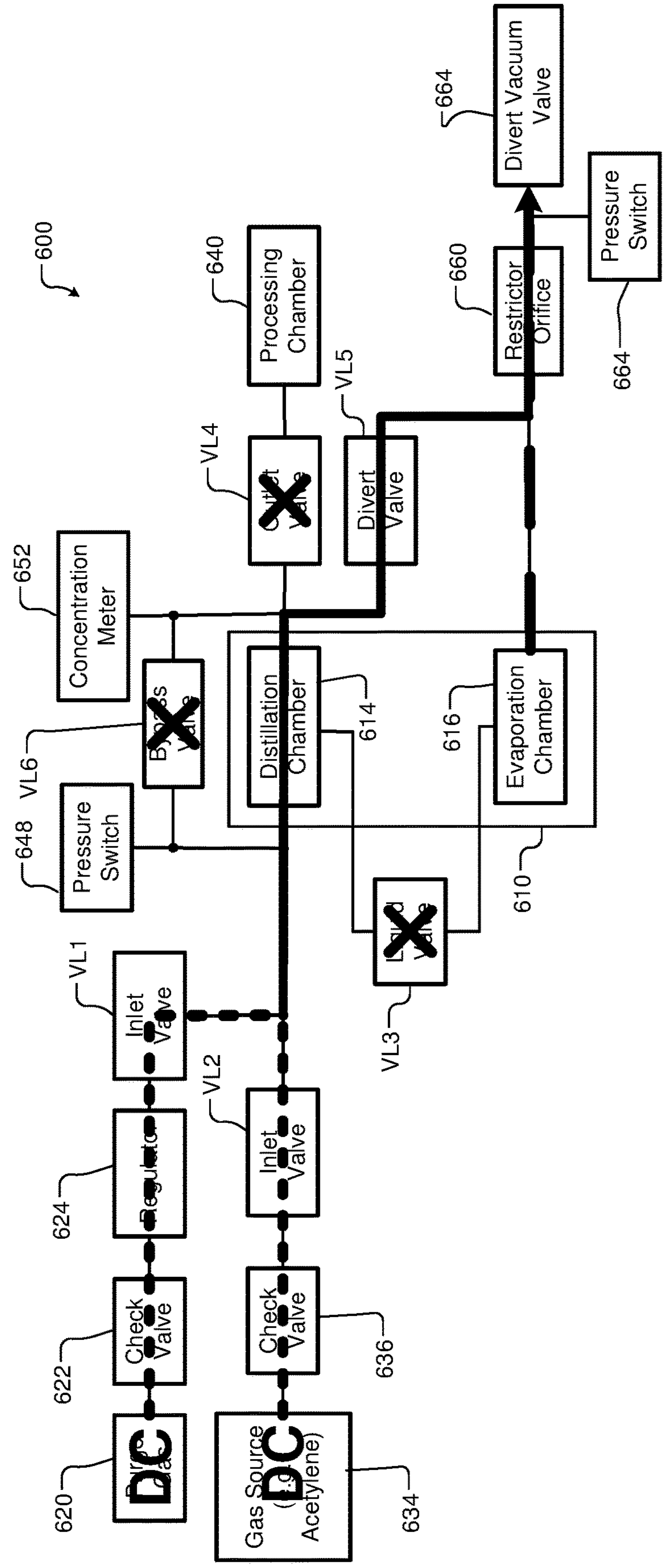

In FIG. 9, the gas delivery system 600 is shown in a flow to divert configuration. The valves VL3, VL4 and VL6 are closed. The valves VL1 and VL2 are don't care (either open or closed). The divert valve VL5 is open. Either the purge gas or the fluid from the gas source 634 can be supplied and diverted through the restricted orifice 660 and the divert vacuum valve 666 to the abatement system. This configuration may be used to clear gas lines following installation of the gas delivery system 600 or during other conditions.

Figure 10:
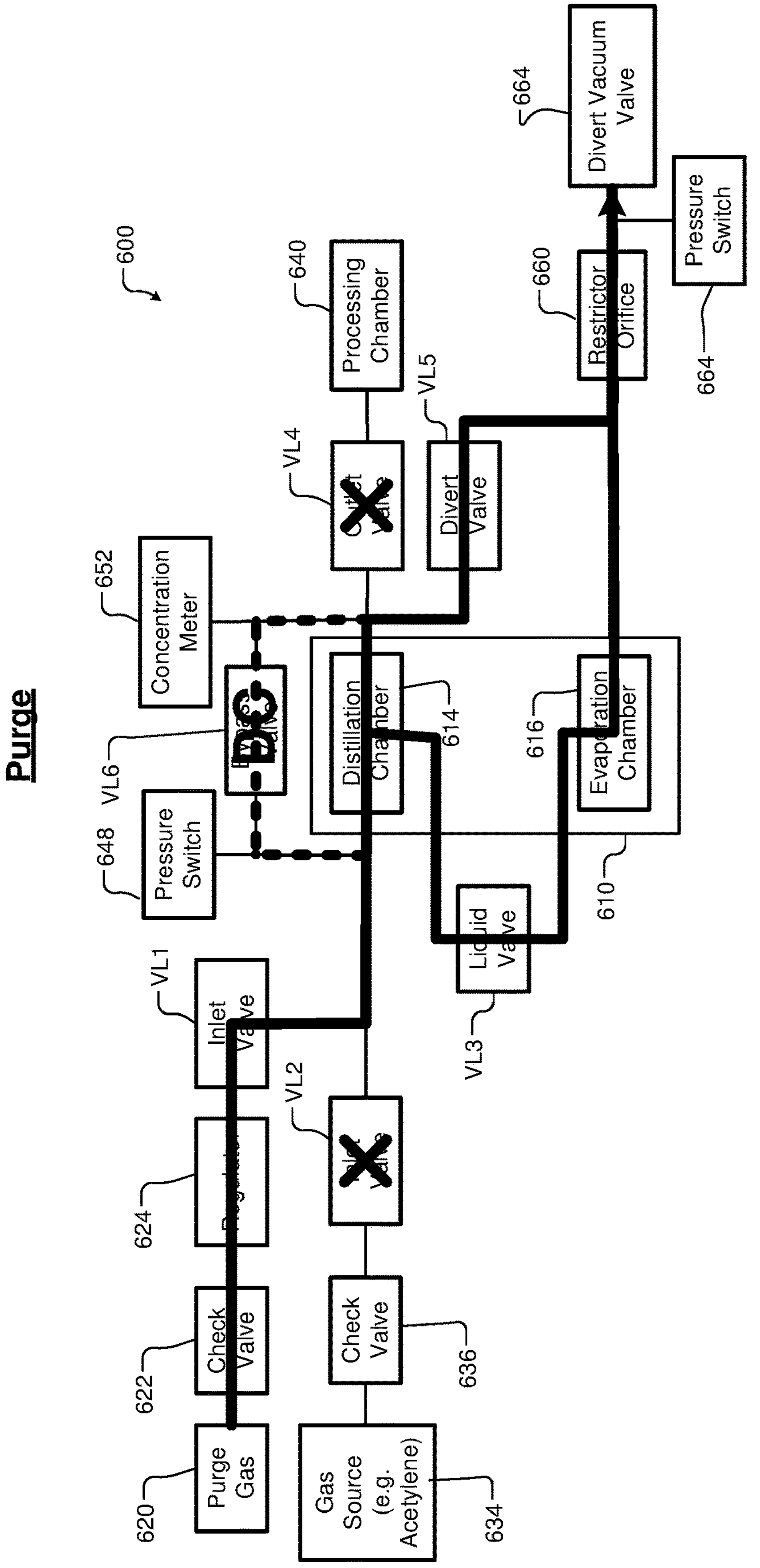

In FIG. 10, the gas delivery system 600 is shown in a purge configuration. The valves VL2 and VL4 are closed. The valves VL1, VL3, and VL5 are open. The valve VL6 can be in either position. Purge gas flows through the inlet valve VL1, the distillation chamber 614, the liquid valve VL3, the evaporation chamber 616, and the divert valve VL5 to the abatement system.

Figure 11:
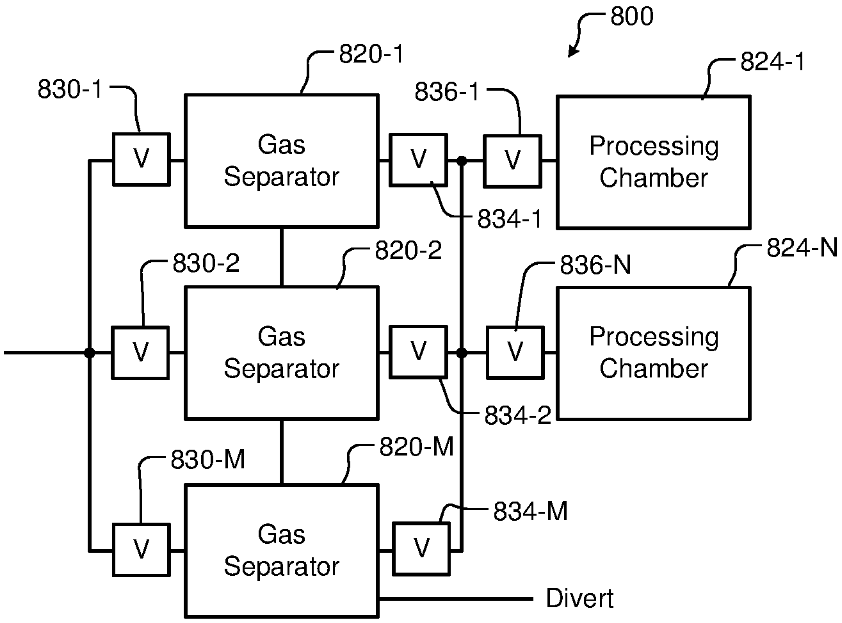
FIG. 11 is a functional block diagram of an example of multiple gas separators selectively connected to zero, one or multiple processing chambers.

Referring now to FIG. 11, a gas delivery system 800 can include M gas separators 820-1, 820-2, . . . , 820-M (collectively gas separators 820) connected to N processing chambers 824-1, . . . , and 824-N (collectively processing chambers 824) where M and N are integers greater than zero. In some examples, M>N. In other examples, M<N or M=N. In the example shown in FIG. 11, M=3 and N−2. Inlet valves 830-1, 830-2, . . . , and 830-M (collectively valves 834) allow control of the fluid supply to zero or more of the M gas separators 820. Outlet valves 834-1, 834-2, . . . , 834-M (collectively valves 834) and valves 836-1, . . . , and 836-N (collectively valves 836) allow control of outputs of the gas separators 820 to the processing chambers 824.

In use, the valves 830, 834 and 836 can be configured such that zero, one or more of the gas separators 820 supply one or more of the processing chambers 824. Alternately, the timing of the processes can be arranged such that M−1 (e.g. 2 when M=3) of the gas separators 820 individually supply the processing chambers 824 (e.g. N=2) while condensed liquid from the other gas separator 820 is moved to the evaporation chamber to reduce downtime. Further, outputs of two or more of the gas separators 820 can be supplied to the same processing chamber if higher gas flow rates are needed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems.

The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A gas separator for a substrate processing system, comprising:

a first distillation chamber;

an evaporation chamber;

a first liquid valve comprising an inlet in fluid communication with the first distillation chamber and an outlet in fluid communication with the evaporation chamber; and a chiller configured to chill the first distillation chamber to a first temperature and the evaporation chamber to a second temperature that is different than the first temperature, wherein during a first mode, the first distillation chamber is configured to receive a gas mixture comprising N gases at an inlet of the first distillation chamber, where N is an integer greater than one, to separate the gas mixture, by condensing at least one of the N gases, into a first condensed liquid and a first separated gas mixture, to store the first condensed liquid in the first distillation chamber and to supply the first separated gas mixture at a first outlet of the first distillation chamber, and wherein during a second mode, the first liquid valve transfers the first condensed liquid from a second outlet of the first distillation chamber to the evaporation chamber and the first distillation chamber does not receive the gas mixture via the inlet of the first distillation chamber and does not supply the first separated gas mixture via the first outlet of the first distillation chamber.

2. The gas separator of claim 1, wherein the first separated gas mixture is supplied to a processing chamber.

3. The gas separator of claim 1, further comprising:

a second distillation chamber configured to receive the first separated gas mixture from the first distillation chamber via a first inlet of the second distillation chamber; and a second liquid valve comprising an inlet in fluid communication with the second distillation chamber.

4. The gas separator of claim 3, wherein:

during a first mode of the second distillation chamber, the second distillation chamber is configured to:

receive the first separated gas mixture at the first inlet of the second distillation chamber, separate the first separated gas mixture, by condensing a different one of the N gases, into a second condensed liquid and a second separated gas mixture, store the second condensed liquid in the second distillation chamber and supply the second separated gas mixture at a first outlet of the second distillation chamber, and during the second mode of the second distillation chamber, the second liquid valve supplies the second condensed liquid from a second outlet of the second distillation chamber to the evaporation chamber and the second distillation chamber does not receive the first separated gas mixture via the first inlet of the second distillation chamber and does not supply the second separated gas mixture via the first outlet of the second distillation chamber.

5. The gas separator of claim 1, wherein the first distillation chamber comprises:

a body defining a torturous path, a cavity and a channel, wherein the torturous path comprises an inlet, in fluid communication with the inlet of the first distillation chamber, to receive the gas mixture and an outlet of the torturous path to supply the first condensed liquid and the first separated gas mixture to the cavity, and wherein the channel fluidly connects the cavity to the first outlet of the first distillation chamber.

6. The gas separator of claim 5, wherein the body of the first distillation chamber is made of a solid block of a material that has been machined.

7. The gas separator of claim 6, wherein the material comprises stainless steel.

8. The gas separator of claim 1, wherein the chiller comprises:

a first cooling member comprising channels configured to receive a fluid;

a first Peltier device comprising a first side in thermal communication with the first cooling member;

a heat transfer member in thermal communication with a second side of the first Peltier device and with the evaporation chamber; and a second Peltier device comprising a first side in thermal communication with the heat transfer member and a second side in thermal communication with the first distillation chamber.

9. The gas separator of claim 1, wherein the gas mixture comprises acetylene and acetone.

10. A gas delivery system comprising:

a gas box housing the gas separator of claim 1; and an abatement system in fluid communication with the gas box and configured to evacuate the gas box during operation of the gas separator.

11. A system comprising:

N of the gas separators of claim 1, where N is an integer greater than one; and M processing chambers, where M is an integer greater than zero, a plurality of valves configured to connect one of the N gas separators to one or more of the M processing chambers.

12. A gas separator for a substrate processing system, comprising:

a distillation chamber configured to operate in a first mode and a second mode, an evaporation chamber;

a first liquid valve comprising an inlet in fluid communication with the distillation chamber and an outlet in fluid communication with the evaporation chamber; and a first chiller arranged in thermal communication with first side surfaces of the distillation chamber and the evaporation chamber and comprising:

a first cooling member comprising channels configured to receive a fluid;

a first Peltier device comprising a first side in thermal communication with the first cooling member;

a heat transfer member in thermal communication with a second side of the first Peltier device and with the evaporation chamber; and a second Peltier device comprising a first side in thermal communication with the first cooling member and a second side in thermal communication with the distillation chamber.

13. The gas separator of claim 12, further comprising a second chiller comprising:

a second cooling member;

a third Peltier device comprising a first side in thermal communication with the second cooling member;

a heat transfer member in thermal communication with a second side of the third Peltier device and with the evaporation chamber; and a fourth Peltier device comprising a first side in thermal communication with the heat transfer member and a second side in thermal communication with the distillation chamber.

14. The gas separator of claim 13, wherein the second chiller is arranged in thermal communication with a second side surface of the distillation chamber and a second side surface of the evaporation chamber.

15. The gas separator of claim 12, wherein the gas separator operates in a batch mode comprising a supply mode and a liquid move mode.

16. The gas separator of claim 12, wherein:

during the first mode, the distillation chamber is configured to:

receive a gas mixture comprising N gases at an inlet of the distillation chamber, where N is an integer greater than one, separate the gas mixture, by condensing at least one of the N gases, into a condensed liquid and a first separated gas mixture, store the condensed liquid in the distillation chamber, and supply the first separated gas mixture to a first outlet of the distillation chamber, and during the second mode, the first liquid valve supplies the condensed liquid stored in the distillation chamber from a second outlet of the distillation chamber to the evaporation chamber and the distillation chamber does not receive the gas mixture via the inlet and does not supply the first separated gas mixture via the first outlet.

17. The gas separator of claim 16, wherein the distillation chamber comprises:

a body defining a torturous path, a cavity and a channel, wherein the torturous path comprises an inlet in fluid communication with the inlet of the distillation chamber to receive the gas mixture and an outlet of the torturous path to supply the condensed liquid and the first separated gas mixture to the cavity, and wherein the channel connects the cavity to the first outlet of the distillation chamber.

18. The gas separator of claim 17, wherein the torturous path has a spiral shape.

19. The gas separator of claim 17, wherein the body of the distillation chamber is made of a solid block of a material than has been machined.

20. The gas separator of claim 19, wherein the material comprises stainless steel.

21. The gas separator of claim 16, wherein the gas mixture comprises acetylene and acetone.

22. A gas delivery system comprising:

a gas box housing the gas separator of claim 12; and an abatement system in fluid communication with the gas box and configured to evacuate the gas box during operation of the gas separator.

23. A system comprising:

N of the gas separators of claim 12, where N is an integer greater than one; and M processing chambers, where M is an integer greater than zero, a plurality of valves configured to connect any one of the N gas separators to any one or more of the M processing chambers.

* * * * *